(12) United States Patent
Kim et al.

(10) Patent No.: US 11,930,081 B2
(45) Date of Patent: Mar. 12, 2024

(54) DISPLAY APPARATUS, ELECTRONIC APPARATUS, AND OPERATING METHODS THEREOF

(71) Applicant: SAMSUNG ELECTRONICS CO., LTD., Suwon-si (KR)

(72) Inventors: Donguk Kim, Suwon-si (KR); Donghoon Seo, Suwon-si (KR); Jungyon Cho, Suwon-si (KR); Junhae Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/901,230

(22) Filed: Sep. 1, 2022

(65) Prior Publication Data

US 2023/0072231 A1 Mar. 9, 2023

Related U.S. Application Data

(63) Continuation of application No. PCT/KR2022/012726, filed on Aug. 25, 2022.

(30) Foreign Application Priority Data

Aug. 27, 2021 (KR) .................. 10-2021-0114250

(51) Int. Cl.
*H04L 61/00* (2022.01)
*H04L 61/5007* (2022.01)
(Continued)

(52) U.S. Cl.
CPC .......... *H04L 67/14* (2013.01); *H04L 61/5007* (2022.05); *H04W 4/80* (2018.02)

(58) Field of Classification Search
None
See application file for complete search history.

(56) References Cited

U.S. PATENT DOCUMENTS 9,553,897 B2   1/2017  Chen et al.
2004/0017814 A1*  1/2004  Shimada ............. H04L 41/0866
                                                    370/392

(Continued)

FOREIGN PATENT DOCUMENTS

CN          103856941 A        6/2014
CN          105376347 B        6/2019
(Continued)

OTHER PUBLICATIONS

PCT/ISA/220 dated Nov. 29, 2022 in International Patent Application No. PCT/KR2022/012726 (9 pages).

*Primary Examiner* — Christopher B Robinson
(74) *Attorney, Agent, or Firm* — STAAS & HALSEY LLP

(57) ABSTRACT

A display apparatus, an electronic apparatus, and operating methods thereof. The display apparatus includes a display, a memory to store one or more instructions, and a processor configured to execute the one or more instructions stored in the memory. The processor executes the one or more instructions to receive a request for a connection with an electronic apparatus, identify a host address in an Internet protocol (IP) address of the display apparatus by referring to a subnet mask of the display apparatus, convert the identified host address into a string comprising one or more characters according to a predefined scheme, display the string on the display, receive a connection request from the electronic apparatus based on representation of the IP address of the display apparatus according to the string displayed on the display, and establish the connection with the electronic apparatus having transmitted the request for the connection.

16 Claims, 9 Drawing Sheets

(51) Int. Cl.
*H04L 67/14* (2022.01)
*H04W 4/80* (2018.01)

(56) References Cited

U.S. PATENT DOCUMENTS

| | | |
|---|---|---|
| 2013/0318116 A1 | 11/2013 | Starbuck et al. |
| 2014/0250213 A1* | 9/2014 | Seki .................... H04L 41/0803 |
| | | 709/220 |
| 2015/0295953 A1 | 10/2015 | Chen et al. |
| 2016/0342645 A1* | 11/2016 | Tempero ............... G06F 16/258 |
| 2019/0020532 A1* | 1/2019 | Saito ................. H04L 61/5014 |

FOREIGN PATENT DOCUMENTS

| | | |
|---|---|---|
| CN | 106487939 B | 10/2019 |
| CN | 112565842 A | 3/2021 |
| JP | 5213070 B2 | 6/2013 |
| JP | 5338597 B2 * | 11/2013 |
| JP | 5845826 | 1/2016 |
| KR | 2001-0056948 | 7/2001 |
| KR | 10-1045452 | 6/2011 |
| KR | 10-2012-0024065 | 3/2012 |
| KR | 10-2014-0029340 | 3/2014 |
| KR | 10-1480513 B1 | 1/2015 |

\* cited by examiner

FIG. 4

A Class IP Address Range & Default Subnet Mask

| 1 | 8 | 9 | 16 | 17 | 24 | 25 | 32 |

| 0NNNNNNN | HHHHHHHH | HHHHHHHH | HHHHHHHH |

⟨ Network ⟩ ⟨ Host ⟩

Range

| 00000000 | 00000000 | 00000000 | 00000000 |  0.0.0.0
| 01111111 | 11111111 | 11111111 | 11111111 |  127.255.255.255

Default Subnet Mask

| 11111111 | 00000000 | 00000000 | 00000000 |  255.0.0.0

B Class IP Address Range & Default Subnet Mask

| 1 | 8 | 9 | 16 | 17 | 24 | 25 | 32 |

| 10NNNNNN | NNNNNNNN | HHHHHHHH | HHHHHHHH |

⟨ Network ⟩ ⟨ Host ⟩

Range

| 10000000 | 00000000 | 00000000 | 00000000 |  128.0.0.0
| 10111111 | 11111111 | 11111111 | 11111111 |  191.255.255.255

Default Subnet Mask

| 11111111 | 11111111 | 00000000 | 00000000 |  255.255.0.0

C Class IP Address Range & Default Subnet Mask

| 1 | 8 | 9 | 16 | 17 | 24 | 25 | 32 |

| 110NNNNN | NNNNNNNN | NNNNNNNN | HHHHHHHH |

⟨ Network ⟩ ⟨ Host ⟩

Range

| 11000000 | 00000000 | 00000000 | 00000000 |  192.0.0.0
| 11011111 | 11111111 | 11111111 | 11111111 |  223.255.255.255

Default Subnet Mask

| 11111111 | 11111111 | 11111111 | 00000000 |  255.255.255.0

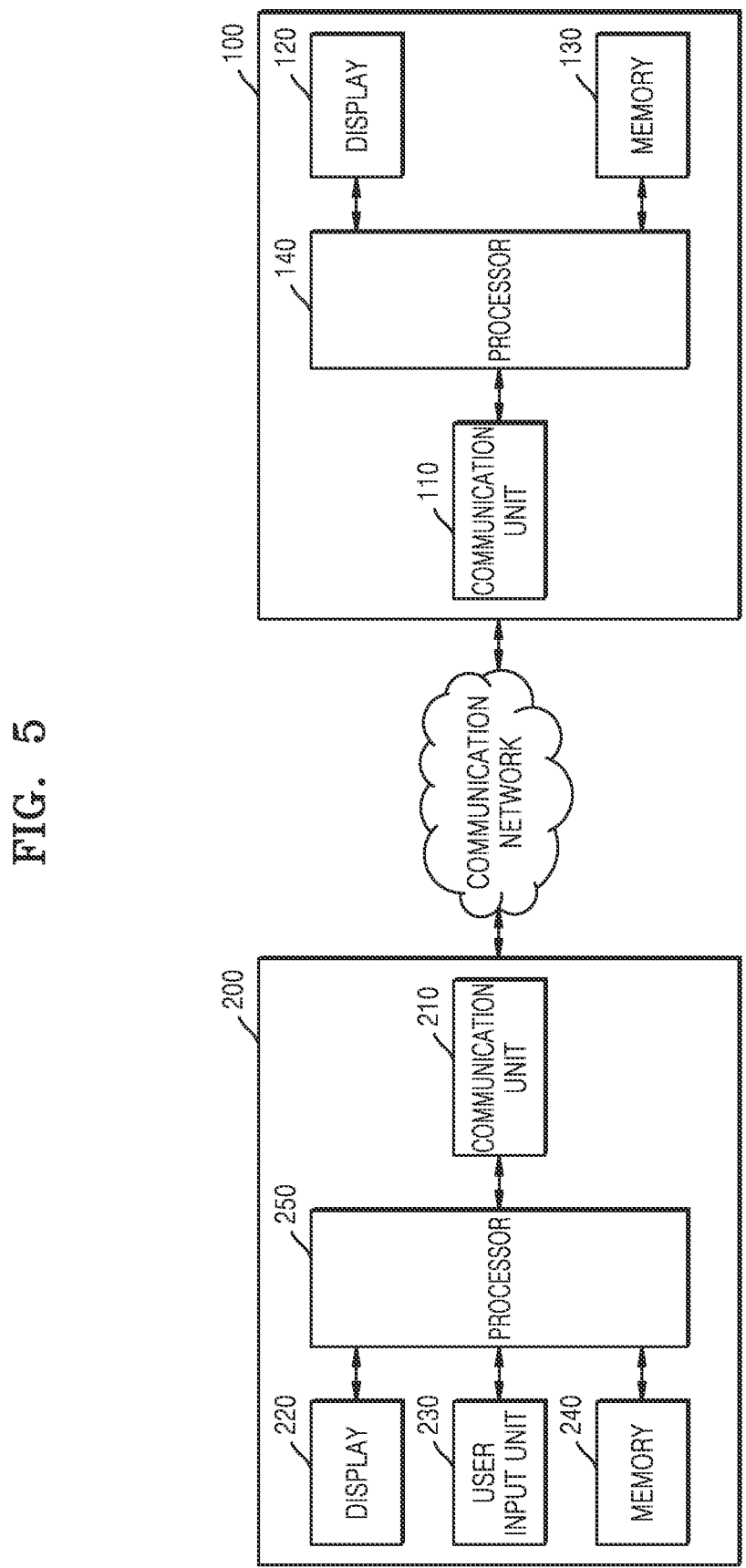

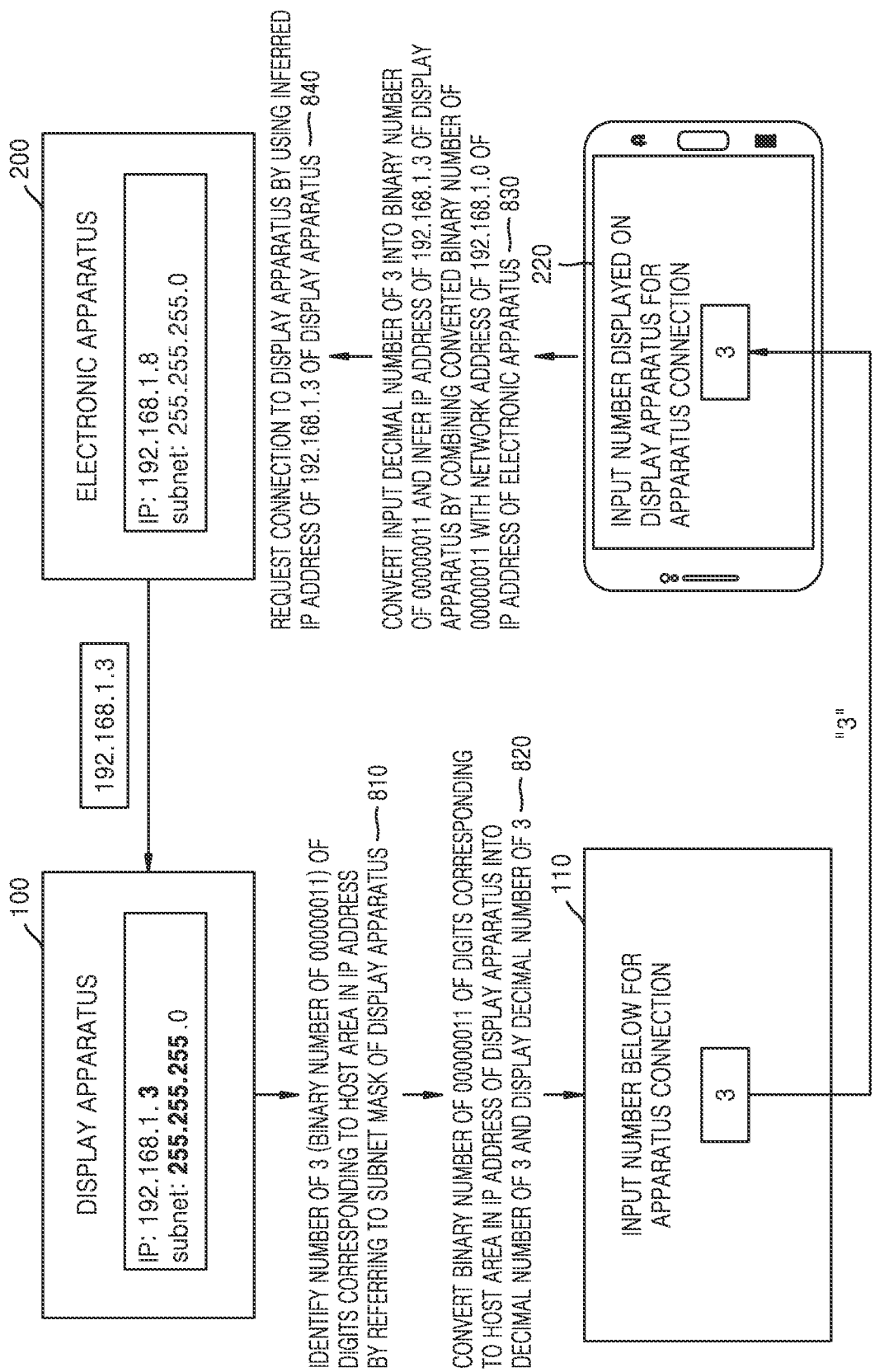

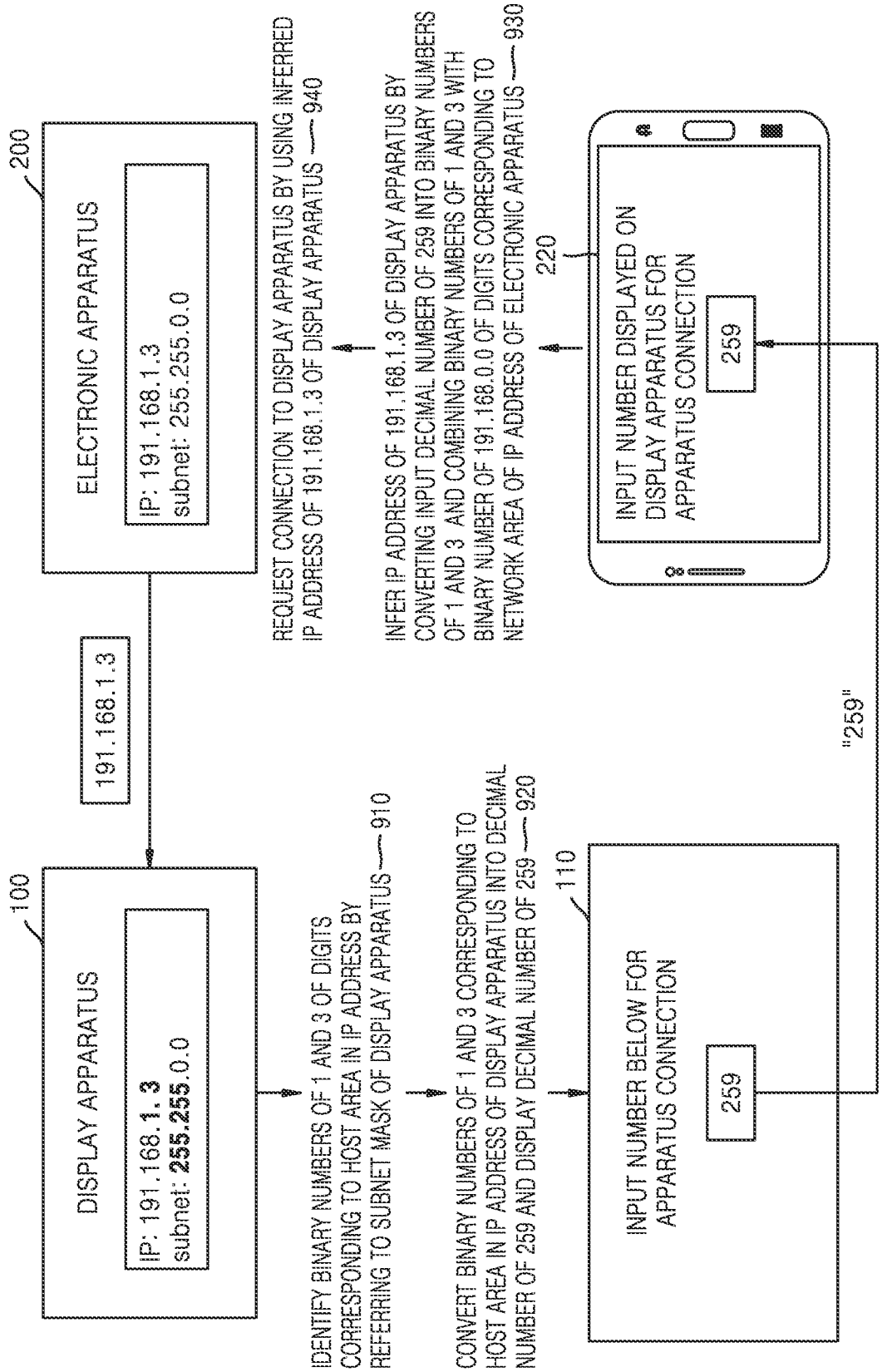

DISPLAY APPARATUS, ELECTRONIC APPARATUS, AND OPERATING METHODS THEREOF

CROSS-REFERENCE TO RELATED APPLICATION

This application is a continuation application, under 35 U.S.C. § 111(a), of international application No. PCT/KR2022/012726, filed on Aug. 25, 2022, which is claims priority under 35 U. S. C. § 119 to Korean Patent Application No. 10-2021-0114250 filed on Aug. 27, 2021, the disclosures of which are incorporated herein by reference in their entirety.

BACKGROUND

Field

Various embodiments of the disclosure relate to a display apparatus and an operating method thereof, and more particularly, to a display apparatus, an electronic apparatus, and operating methods thereof, which allow easy connection of devices on a same network.

Description of Related Art

Devices connected to a computer network may communicate using an Internet protocol (IP) address, which is a special number used for the devices to recognize and communicate with each other on the computer network. A device for requesting a communication connection has to send a communication connection request using an IP address of a counterpart device for the communication connection to the counterpart device for the communication connection. To this end, the IP address of the counterpart device for the communication connection may have to be input to the device for requesting the communication connection. In such case, a 32-bit IP address generally has a long string, thus requiring a method of replacing the long string with a more concise string.

SUMMARY

According to an embodiment of the disclosure, a display apparatus includes a display, a memory to store one or more instructions, and a processor configured to execute the one or more instructions stored in the memory. The processor executing the one or more instructions to receive a request for a connection with an electronic apparatus, identify a host address in an Internet protocol (IP) address of the display apparatus by referring to a subnet mask of the display apparatus, convert the identified host address into a string including one or more characters according to a predefined scheme, display the string on the display, receive a connection request from the electronic apparatus based on representation of the IP address of the display apparatus according to the string displayed on the display, and establish the connection with the electronic apparatus having transmitted the request for the connection.

According to an embodiment of the disclosure, the processor may be further configured to, by executing the one or more instructions, identify, as the host address, bit values of the IP address of the display apparatus in positions corresponding to consecutive bits of 0s in the subnet mask of the display apparatus.

According to an embodiment of the disclosure, the processor may be further configured to, by executing the one or more instructions, convert the identified host address into the string by converting a binary number of the identified host address into a decimal number.

According to another embodiment of the disclosure, an electronic apparatus includes a display, a memory to store one or more instructions, and a processor configured to execute the one or more instructions stored in the memory. The processor executing the one or more instructions to output a graphics user interface for inputting address information of a display apparatus to which the electronic apparatus is to be connected, receive a string input through the graphics user interface, obtain a host address of the display apparatus from the received string input, identify a network address in an Internet protocol (IP) address of the electronic apparatus by referring to a subnet mask of the electronic apparatus, infer an IP address of the display apparatus by combining the identified network address of the electronic apparatus with the obtained host address of the display apparatus, and transmit a connection request to the display apparatus by using the inferred IP address of the display apparatus.

According to an embodiment of the disclosure, the processor may be further configured to, by executing the one or more instructions, identify, as the network address, bit values of the IP address of the electronic apparatus in positions corresponding to consecutive bits of 1s in the subnet mask of the electronic apparatus.

According to an embodiment of the disclosure, the processor may be further configured to, by executing the one or more instructions, obtain the host address of the display apparatus by converting a decimal number expressed according to the received string input into a binary number.

According to an embodiment of the disclosure, the processor may be further configured to, by executing the one or more instructions, infer the IP address of the display apparatus by combining the identified network address which is expressed as a binary number with the host address of the display apparatus which is expressed as a binary number.

According to another embodiment of the disclosure, an operating method of a display apparatus includes receiving a request for a connection with an electronic apparatus, identifying a host address in an Internet protocol (IP) address of the display apparatus by referring to a subnet mask of the display apparatus, converting the identified host address into a string including one or more characters according to a predefined scheme, displaying the string on a display, receiving a connection request from an electronic apparatus based on representation of the IP address of the display apparatus according to the string displayed on the display, and the a connection with the electronic apparatus having transmitted the request for the connection.

According to another embodiment of the disclosure, an operating method of an electronic apparatus includes outputting a graphics user interface for inputting address information of a display apparatus to which the electronic apparatus is to be connected, receiving a string input through the graphics user interface, obtaining a host address of the display apparatus from the received string input, identifying a network address in an Internet protocol (IP) address of the electronic apparatus by referring to a subnet mask of the electronic apparatus, inferring an IP address of the display apparatus by combining the identified network address of the electronic apparatus with the obtained host address of the display apparatus, and transmitting a connection request to the display apparatus by using the inferred IP address of the display apparatus.

According to another embodiment of the disclosure, in a computer-readable recording medium having recorded thereon one or more programs executable by a processor of a display apparatus to implement an operating method of the display apparatus. The operating method of the display apparatus includes receiving requesting request for a connection with an electronic apparatus, identifying a host address in an Internet protocol (IP) address of the display apparatus by referring to a subnet mask of the display apparatus, converting the identified host address into a string including one or more characters according to a predefined scheme, displaying the string on a display, receiving a connection request from an electronic apparatus based on representation of the IP address of the display apparatus according to the string displayed on the display, generated based on the string, and establishing the connection to the electronic apparatus having transmitted the request for the connection.

According to another embodiment of the disclosure, in a computer-readable recording medium having recorded thereon one or more programs executable by a processor of an electronic apparatus to implement an operating method of the electronic apparatus. The operating method of the electronic apparatus includes outputting a graphics user interface for inputting address information of a display apparatus to which the electronic apparatus is to be connected, receiving a string input through the graphics user interface, obtaining a host address of the display apparatus from the received string input, identifying a network address in an Internet protocol (IP) address of the electronic apparatus by referring to a subnet mask of the electronic apparatus, inferring an IP address of the display apparatus by combining the identified network address of the electronic apparatus with the obtained host address of the display apparatus, and transmitting a connection request to the display apparatus by using the inferred IP address of the display apparatus.

BRIEF DESCRIPTION OF DRAWINGS

This disclosure may be readily understood by reference to the following detailed description and the accompanying drawings, in which reference numerals refer to structural elements.

FIG. 4 is a reference diagram for describing A class, B class, and C class IP addresses according to an embodiment of the disclosure.

FIG. 5 is a schematic block diagram of a display apparatus and an electronic apparatus, according to an embodiment of the disclosure.

FIG. 8 illustrates a detailed example of converting an IP address into a string by using a part of the IP address, according to an embodiment of the disclosure.

FIG. 9 illustrates a detailed example of converting an IP address into a string by using a part of the IP address, according to an embodiment of the disclosure.

DETAILED DESCRIPTION OF EXEMPLARY EMBODIMENTS

Figure 1:
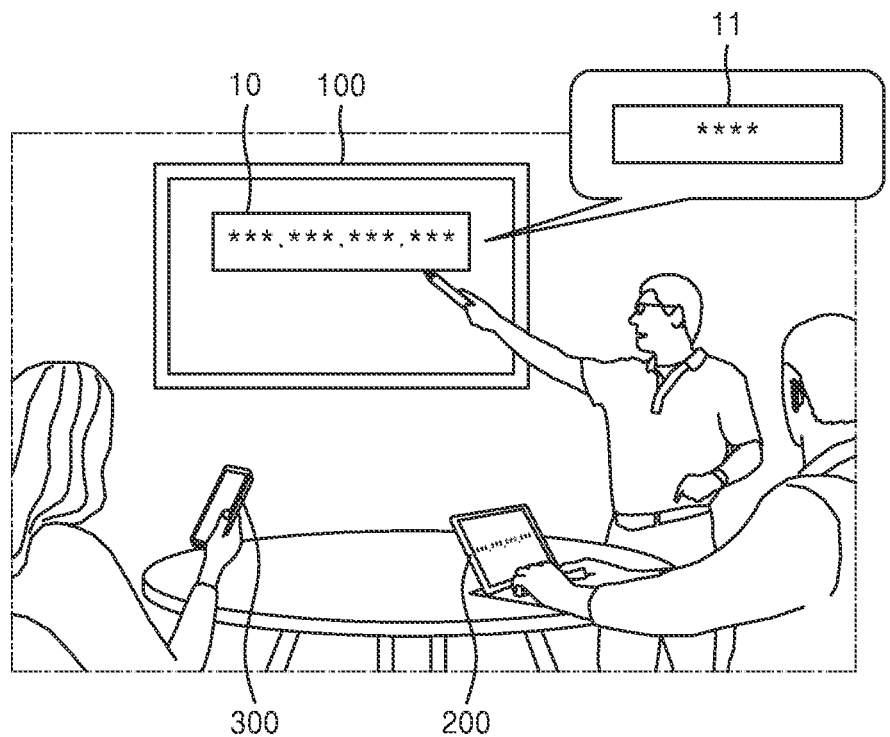
FIG. 1 is a reference diagram for describing a method of connecting devices on a same network, according to embodiment(s) of the disclosure.

Throughout the disclosure, the expression "at least one of a, b or c" indicates only a, only b, only c, both a and b, both a and c, both b and c, all of a, b, and c, or variations thereof.

Terms used herein will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms may be disclosed in a corresponding description part of the disclosure. Therefore, the terms used in the disclosure should be defined not by the simple names of the terms but by the meaning of the terms and the contents throughout the disclosure.

Throughout the entirety of the specification of the disclosure, when it is assumed that a certain part includes a certain component, the term 'including' means that a corresponding component may further include other components unless specially described to the contrary. The term used herein such as "unit" or "module" indicates a unit for processing at least one function or operation, and may be implemented in hardware, software, or in a combination of hardware and software.

Hereinafter, embodiments of the disclosure will be described in detail with reference to the attached drawings to allow those of ordinary skill in the art to easily carry out the embodiments of the disclosure. However, the disclosure may be implemented in various different forms, and are not limited to the embodiments of the disclosure described herein. To clearly describe the disclosure, parts that are not associated with the description have been omitted from the drawings, and throughout the specification, identical reference numerals refer to identical parts.

In an embodiment of the present specification, the term "user" means a person who controls a function or an operation of a computing device or an electronic device by using a control device, and may include a viewer, a manager, or an installation engineer.

Various embodiments of the disclosure provide a display apparatus, an electronic apparatus, and operating methods thereof, to reduce the possibility of input errors and increase the convenience of enabling simple input, for users, when devices connected to a same network are connected to one another.

According to various embodiments of the disclosure, when devices connected to a same network are connected to one another, by expressing an Internet protocol (IP) address as a simple string, the possibility of input errors may be reduced and the convenience of enabling simple input may be increased, for users.

FIG. 1 is a reference diagram for describing a method of connecting devices on a same network, according to embodiments of the disclosure.

A plurality of devices may be connected to one network. One network may refer to a network to which connection may be possible without through a router. Internet protocol (IP) addresses of devices connected to one network may have one identical network address.

Referring to FIG. 1, a display apparatus 100, an electronic apparatus 200, and an electronic apparatus 300 may be connected to one identical network. Although it is illustrated in FIG. 1 that the display apparatus 100 is an electronic board device such as a flip, the electronic apparatus 200 may be a laptop computer, and the electronic apparatus 300 may be a smart phone, this is merely an example, and a device connectable to the network may include various electronic apparatuses, computing devices, and display apparatuses.

For example, to connect the electronic apparatus 200 or the electronic apparatus 300 to the display apparatus 100, the display apparatus 100 may display an IP address 10 of the display apparatus 100 on a display of the display apparatus 100, and users of the electronic apparatus 200 and the electronic apparatus 300 may input the IP address 10 of the display apparatus 100 to the electronic apparatus 200 and the electronic apparatus 300, respectively, such that the electronic apparatus 200 and the electronic apparatus 300 may request connection to the display apparatus 100 by using the input IP address 10 of the display apparatus 100. An IP address includes four three-digit decimal numbers followed by <.> for separating each decimal number, such that the user of the electronic apparatus 200 and the user of the electronic apparatus 300 may have to input a total of 15 strings including numbers and <.>. An error is likely to occur when a user inputs a lot of strings, and this input operation may be quite inconvenient for the user. Therefore, embodiments disclosed herein propose a scheme to easily connect devices on one identical network.

According to an embodiment of the disclosure, the display apparatus 100 may generate a string 20 based on a host address indicating a host area in the IP address 10 of the display apparatus 100 and display the generated string on the display, based on that a network address indicating a network area in an IP address of the electronic apparatus 200 or the electronic apparatus 300 connected to one identical network has the same value as a network address of the display apparatus 100. Such a string 11 may be expressed with a much smaller number of characters than a string required for expressing the entire IP address because the string 11 includes characters of a number required for expressing a host address that is a part of the IP address. Thus, for the users of the electronic apparatus 200 or the electronic apparatus 300, an operation of inputting a much smaller number of characters for connection to the display apparatus 100 is required, thereby significantly reducing the possibility of input errors and saving a time for a character input operation.

According to an embodiment of the disclosure, the display apparatus 100 may identify a host address indicating a host area in an IP address by referring to a subnet mask of the display apparatus 100, convert the identified host address into a decimal number, and display the decimal number on the display.

According to an embodiment of the disclosure, the display apparatus 100 may establish connection, when receiving a connection request using an IP address of the display apparatus 100 from the electronic apparatus 200 or the electronic apparatus 300.

According to an embodiment of the disclosure, when receiving a string input for connection to the display apparatus 100, the electronic apparatus 200 may identify a network address in an IP address of the electronic apparatus 200 by referring to a subnet mask of the electronic apparatus 200, infer the IP address of the display apparatus 100 based on the identified network address and the input string, and transmit a connection request to the display apparatus 100 by using the inferred IP address of the display apparatus 100.

As such, in a situation where connection between devices or apparatuses is required on the same network, a string for an IP address may be input conveniently according to embodiments disclosed in the disclosure. For example, at school, when a teacher manipulates an electronic board device and students need to connect to the electronic board device using their personal portable devices, the students may manipulate an operation of connecting their personal portable devices to the electronic board device using a simpler string. For example, at work, when a presenter manipulates an electronic board device and coworkers need to connect to the electronic board device using their personal portable devices, the coworkers may manipulate an operation of connecting their personal portable devices to the electronic board device using a simpler string. For example, at home, when family members need to connect to a television in the living room by using their personal portable devices, the family members may manipulate an operation of connecting their personal portable devices to the television using a simpler string.

First, referring to FIGS. 2 to 4, an IP address system will be described.

Figure 2:
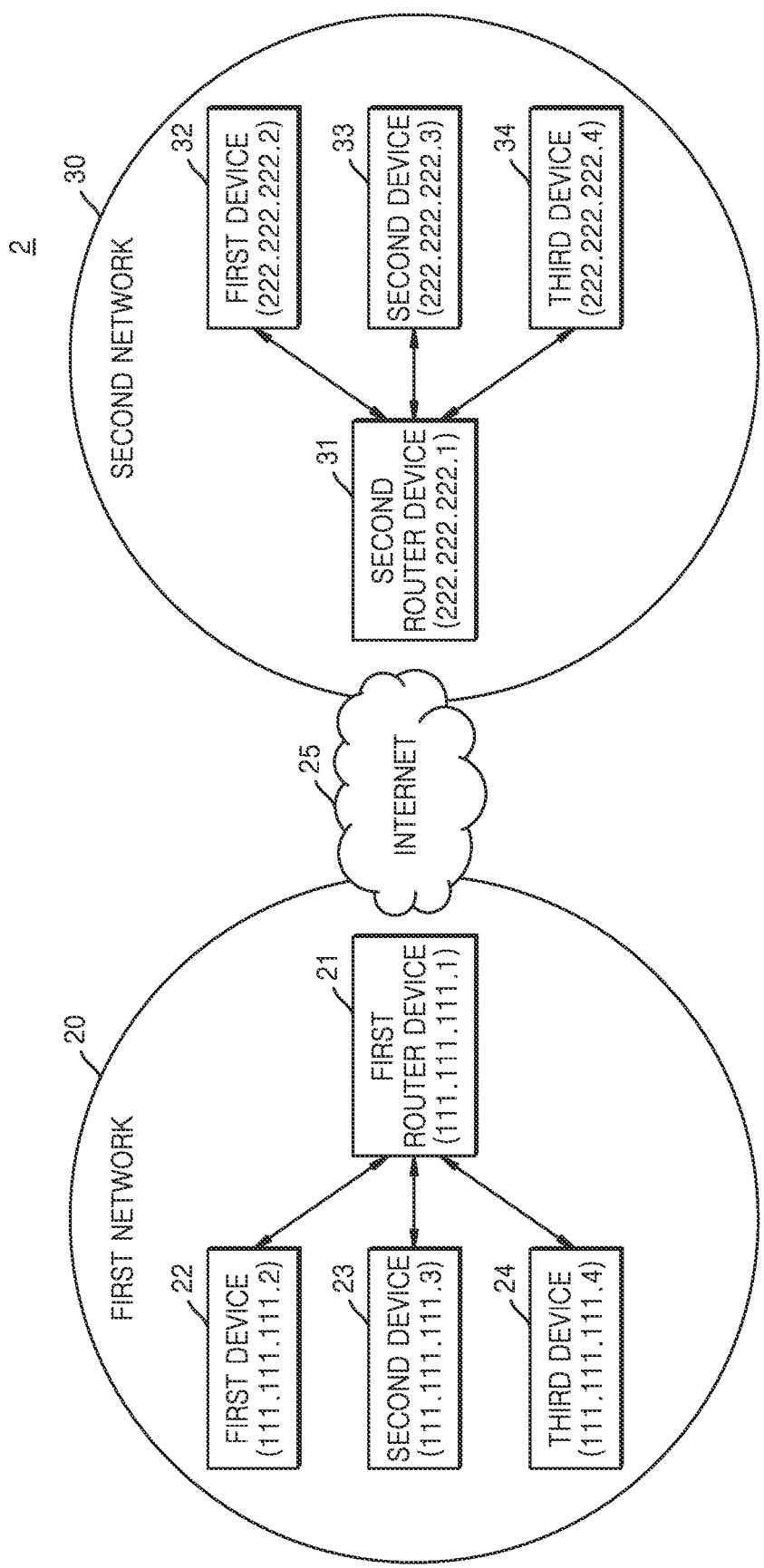
FIG. 2 is a reference diagram for describing an Internet protocol (IP) address of devices connected to a same network, according to an example based on an embodiment of the disclosure.

FIG. 2 is a reference diagram for describing an IP address of devices connected to a same network, according to an example.

Referring to FIG. 2, a system 2 may include a first network 20, a second network 30, and the Internet 25 that connects the first network 20 to the second network 30.

The first network 20, which is a local network inside a house of a subscriber, may include a first router device 21, a first device 21, a second device 23, and a third device 24. The number of devices is not limited.

The first router device 21, which is a router device installed inside the house of the subscriber, may have a function of performing routing processing, etc., to realize IP communication with an IP network such as the local network inside the house of the subscriber, the Internet, etc. When the first router device 21 is assigned with a global IP address as a result of exchange processing of dynamic host configuration protocol (DHCP) messages, the first router device 21 may communicate with the Internet 25 by using the assigned IP address.

Devices may be user terminals installed inside the house of the subscriber. Examples of the devices may include personal computers (PC), mobile note PCs, thin client terminals, workstation, mobile phones, car navigation (car navigation systems), portable game consoles, home game consoles, gadgets (electronic devices), handy terminals, interactive televisions, digital tuners, digital recorders, information home appliances, Point of sales (PoS) terminals, office automation (OA) devices, IP phone compatible phones, etc. However, the devices are not limited to these examples.

The second network 30, which is a network distinguished from the first network 20, may include a second router device 31, a first device 32, a second device 33, and a third device 34.

The Internet 25 may be an Internet service network. The Internet 25 may include a wide area network (WAN), a backbone, a cable TV (CATV) line, a next-generation network (NGN), or the like.

Devices included in the first network 20, i.e., the first router device 21, the first device 22, the second device 23, and the third device 24 may have IP addresses (111.111.111.1), (111.111.111.2), (111.111.111.3), and (111.111.111.4), respectively. In an IP address expressed with four three-digit decimal numbers, three leading decimal numbers, i.e., (111, 111, 111) may express a network address indicating the first network 20 and one last decimal number (1, 2, 3, or 4) may express a host address of each device in the first network 20, for devices included in the first network 20.

Devices included in the second network 30, i.e., the second router device 31, the first device 32, the second device 33, and the third device 34 may have IP addresses (222.222.222.1), (222.222.222.2), (222.222.222.3), and (222.222.222.4), respectively. In an IP address expressed with four three-digit decimal numbers, three leading decimal numbers, i.e., (222.222.222) may express a network address indicating the second network 30 and one last decimal number (1, 2, 3, or 4) may express a host address of each device in the second network 30, for devices included in the second network 30.

As such, devices connected to the same network have the same network address in the IP address including the network address and the host addresses. Thus, on the same network, the devices may use the host addresses to identify one another. The disclosure may provide a string for an IP address by using such a feature.

Figure 3:
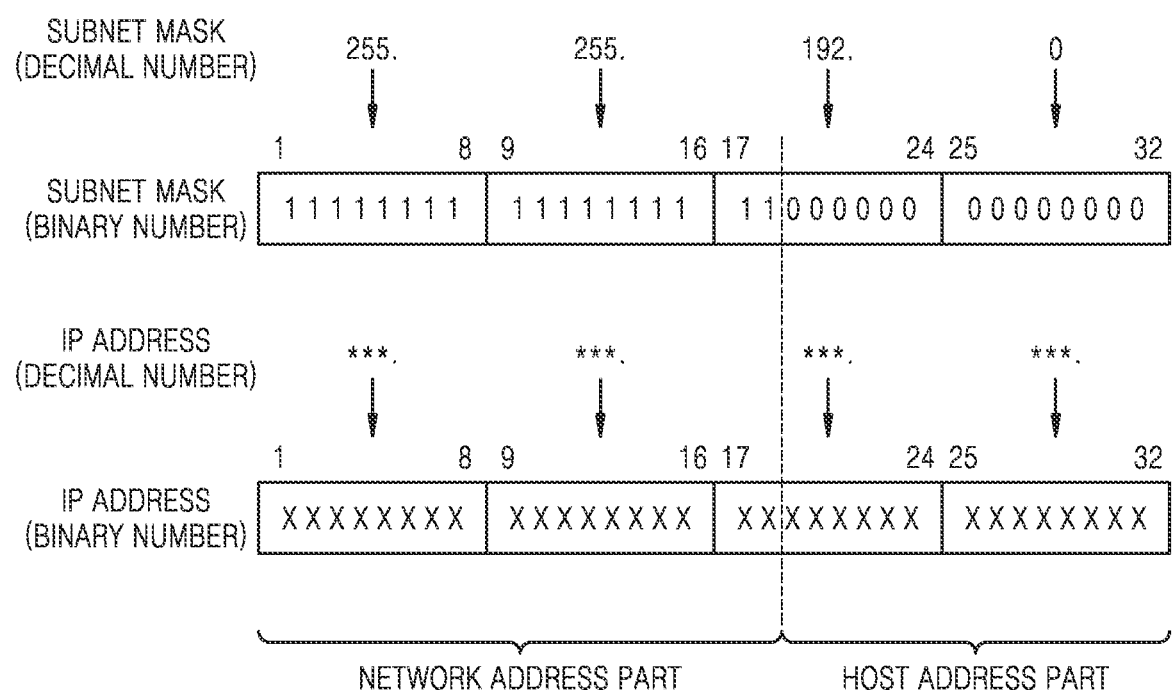
FIG. 3 is a reference diagram for describing an IP address and a subnet mask according to an embodiment of the disclosure.

FIG. 3 is a reference diagram for describing an IP address and a subnet mask.

The IP address may include 12 decimal forms, e.g., (218.237.65.14) as a unique number for identifying a device connected to the Internet. Each decimal number means an 8-digit binary number, such that the IP address includes 32 bits. 218.237.65.1 may be expressed as a binary form as below.

11011010.11101101.01000001.00000001

An IP address may be divided into a network address and a host address. The network address may be used to identify a network to which a device belongs, and the host address may be used to identify the device in the network.

All devices included in one network may have the same network address, and each device in the network may be identified by a unique host address. Herein, one network may mean a range in which communication may be performed between devices without a device connecting a network to another network, such as a router. When a device such as a router is required for communication between devices, this may mean that the devices are not on one network.

Subnetting may mean separating an IP address into a network address part and a host address part to efficiently distribute a limited resource for improvement of network performance. An excessively large broadcast domain may slow packet transmission and degrade performance in a network environment. Thus, communication performance may be guaranteed by dividing the network. The IP address may be expressed with a 32-digit binary number. That is, a maximum of $2^{32}$ addresses may be expressed by an IP address format. The number of addresses that can be expressed by the IP address format is limited, such that a required network address may be allocated to a host IP using a subnet mask, thereby preventing waste.

The subnet mask basically includes 1 and 0, which may indicate how many high-order bits of the IP address correspond to the network address. The subnet mask may be represented by a binary number expressing the network address part of the IP address with 1s and the host address part with 0s. Thus, the network address part of the IP address may be obtained by calculating bitwise AND of the IP address and the subnet mask, the network address part of the IP address may be obtained.

Referring to FIG. 3, $1^{st}$ to $18^{th}$ bits of the subnet mask are consecutively expressed with 1, and $19^{th}$ to $32^{nd}$ bits are consecutively expressed with 0. Thus, a part from the $1^{st}$ to $18^{th}$ bits of the IP address may indicate the network address part, and a part from the $19^{th}$ to $32^{nd}$ bits may correspond to the host address part. Thus, by referring to bit information of the subnet mask, the network address part and the host address part of the IP address may be identified.

FIG. 4 is a reference diagram for describing A class, B class, and C class IP addresses.

Referring to FIG. 4, the A class IP address may be used in a large-scale network environment. A default subnet mask may be 255.0.0.0. A host range is 24 bits, such that the number of hosts per network may be $2^{24}$, i.e., about sixteen million.

The B class IP address may be used in a mid-scale network environment. A default subnet mask may be 255.255.0.0. A host range is 16 bits, such that the number of hosts per network may be $2^{16}$, i.e., about 65000.

The C class IP address may be used in a small-scale network environment. A default subnet mask may be 255.255.255.0. A host range is 8 bits, such that the number of hosts per network may be $2^{8}$, i.e., about 256.

Disclosed embodiments of the disclosure will be described in detail with reference to FIGS. 5 to 10.

FIG. 5 is a schematic block diagram of a display apparatus and an electronic apparatus, according to an embodiment of the disclosure.

Referring to FIG. 5, the display apparatus 100 may include a communication unit 110, a display 120, a memory 130, and a processor 140.

The communication unit 110 may include one or more modules that enable wireless communication between the display apparatus 100 and a wireless communication system or between the display apparatus 100 and a network where another electronic apparatus is located. For example, the communication unit 110 may include a mobile communication module 121 for transmitting and receiving a wireless signal on a mobile communication network, a wireless Internet module 122 for wireless Internet connection, and a short-range communication module 123 for short-range communication.

According to an embodiment of the disclosure, the communication unit 110 may include a Wireless Fidelity (WiFi) communication module. The communication unit 110 may establish a communication connection with a communication unit 210 of the electronic apparatus 200 through a communication network by using the WiFi communication module.

The display 120 may display an image signal processed by the processor 140 on a screen.

According to an embodiment of the disclosure, the display 120 may display a string for the IP address of the electronic apparatus 100 under control of the processor 140. The string for the IP address of the electronic apparatus 100 displayed in the display 120 may include one or more characters. Each character may represent a number according to decimal notation.

The memory 130 may store a program related to an operation of the display apparatus 100 and various data generated during the operation of the display apparatus 100.

According to an embodiment of the disclosure, the memory 130 may include an application for wireless communication connections with an external device, e.g., the electronic apparatus 200. The application for wireless communication connections may include one or more instructions for performing operations of the display apparatus 100 disclosed in this disclosure.

The processor 140 may control the overall operation of the display apparatus 100. According to an embodiment of the disclosure, the processor 140 may execute the one or more instructions included in the application for wireless communication connections stored in memory 130.

According to an embodiment of the disclosure, the processor 140 may receive a user input requesting a wireless communication connection with the electronic apparatus 200. For example, the processor 140 may provide a menu or item for receiving the user input requesting the wireless communication connection with the electronic apparatus 200. The processor 140 may then receive a user input selecting the menu or item from the user.

According to an embodiment of the disclosure, the processor 140 may identify a host address of an IP address of the display apparatus 100 by referring to a subnet mask of the display apparatus 100, when receiving the user input requesting the wireless communication connection with the electronic apparatus 200, convert the identified host address into a string including one or more characters according to a predefined scheme, and display the string on the display.

According to an embodiment of the disclosure, the processor 140 may receive a connection request from the electronic apparatus 200 based on an IP address of the display apparatus 100 generated based on the string, and establish a connection with the electronic apparatus 200 having transmitted the connection request.

According to an embodiment of the disclosure, the processor 140 may identify, as the host address, bit values of the IP address of the display apparatus 100 in positions corresponding to consecutive bits of 0s in the subnet mask of the display apparatus 100.

According to an embodiment of the disclosure, the processor 140 may convert a binary number of the identified host address into a decimal number to convert the identified host address into the string to be displayed on the display.

The electronic apparatus 200 may include a communication unit 210, a display 220, a user input unit 230, memory 240, and a processor 250.

The communication unit 210 may include one or more modules that enable wireless communication between the electronic apparatus 200 and a wireless communication system or between the electronic apparatus 200 and a network where another electronic apparatus is located. For example, the communication unit 210 may include a mobile communication module for transmitting and receiving a wireless signal on a mobile communication network, a wireless Internet module for wireless Internet connection, and a short-range communication module for short-range communication.

For example, the communication unit 210 may include a WiFi communication module. The communication unit 210 may establish a communication connection with the communication unit 110 of the display apparatus 100 through a communication network by using the WiFi communication module.

The display 220 may display an image signal processed by the processor 250 on a screen.

According to an embodiment of the disclosure, the display 220 may display a graphics user interface for inputting the string for the IP address of the display apparatus 100 under control of the processor 250.

The user input unit 230, which is a means for receiving a user input, may include various means such as a touch sensor, a keyboard, a virtual keyboard, etc.

According to an embodiment of the disclosure, the user input unit 230 may receive a string input for the IP address of the display apparatus 100.

The memory 240 may store a program related to an operation of the electronic apparatus 200 and various data generated during the operation of the electronic apparatus 200.

According to an embodiment of the disclosure, the memory 240 may include an application for wireless communication connections with an external device, e.g., the display apparatus 100. The application for wireless communication connections may include one or more instructions for performing operations of the electronic apparatus 200 disclosed in this disclosure.

The processor 140 may control the overall operation of the electronic apparatus 200.

According to an embodiment of the disclosure, the processor 250 may execute the one or more instructions included in the application for wireless communication connections stored in memory 240.

According to an embodiment of the disclosure, the processor 250 may control the display 210 to output a graphics user interface for inputting address information of a display apparatus 100 to be connected.

According to an embodiment of the disclosure, the processor 250 may receive a string input through the graphics user interface and obtain the host address of the display apparatus 100 from the received string input.

According to an embodiment of the disclosure, the processor 250 may identify the network address in the IP address of the electronic apparatus 200 with reference to the subnet mask of the electronic apparatus 200, combine the identified network address with the obtained host address to infer the IP address of the display apparatus 100, and transmit a connection request to the display apparatus 100 by using the inferred IP address of the display apparatus 100.

According to an embodiment of the disclosure, the processor 250 may identify, as the network address, bit values of the IP address of the electronic apparatus 200 in positions corresponding to consecutive bits of 1s in the subnet mask of the electronic apparatus 200.

According to an embodiment of the disclosure, the processor 250 may convert a decimal number represented according to the received string input into a binary number to obtain the host address of the display apparatus 100.

According to an embodiment of the disclosure, the processor 250 may infer the IP address of the display apparatus 100 by combining the identified network address which is expressed as a binary number with the host address of the display apparatus 100 which is expressed as the binary number.

The electronic apparatus 200 may be implemented as various devices such as a smart phone, a laptop computer, a personal digital assistant (PDA), a portable multimedia player (PMP), a personal portable terminal, etc.

While an apparatus for transmitting a communication connection request is referred to as the electronic apparatus 200 and an apparatus for receiving the communication connection request is referred to as the display apparatus 100 in FIG. 5, the disclosure is not limited thereto. An apparatus functioning or serving as the display apparatus 100 disclosed in the disclosure may also be referred to as an electronic apparatus, a computing apparatus, or a server apparatus. An apparatus functioning or serving as the electronic apparatus 200 disclosed in the disclosure may also be referred to as a terminal apparatus, a portable apparatus, or a client apparatus. Alternatively, to distinguish the display apparatus 100 from the electronic apparatus 200, the display apparatus 100 may be referred to as a first apparatus and the electronic apparatus 200 may be referred to as a second apparatus.

Figure 6:
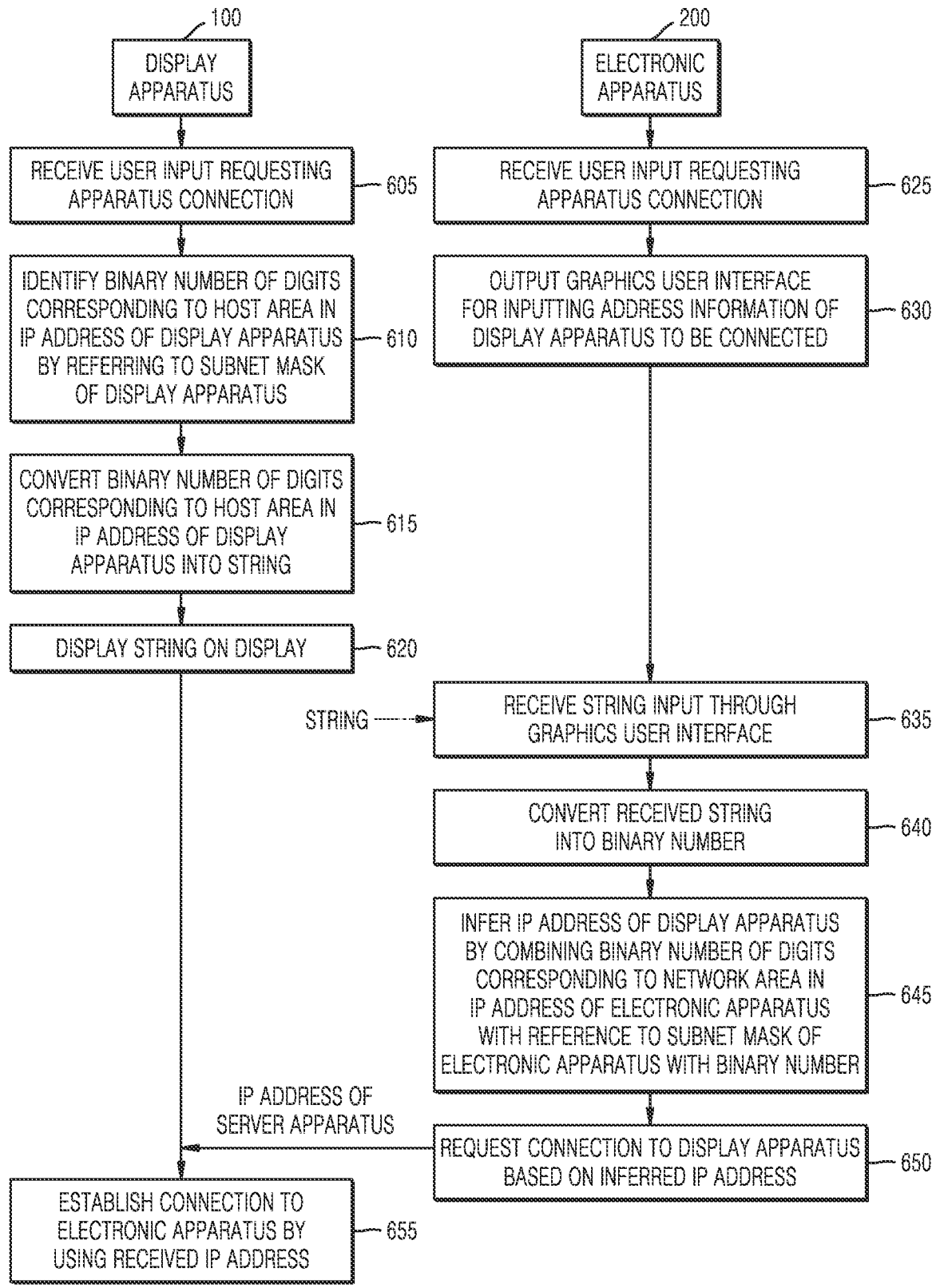
FIG. 6 is a flowchart of a process of an operating method of a display apparatus and an electronic apparatus, according to an embodiment of the disclosure.

FIG. 6 is a flowchart of a process of operations between a display apparatus and an electronic apparatus, according to an embodiment of the disclosure.

Referring to FIG. 6, in operation 605, the display apparatus 100 may receive a user input requesting an apparatus connection.

For example, the display apparatus 100 may output a menu or item for receiving the user input requesting the apparatus connection and receive a user input selecting the menu or item.

In operation 610, the display apparatus 100 may identify a binary number of digits corresponding to the host area in the IP address of the display apparatus 100 by referring to the subnet mask of the display apparatus 100.

The display apparatus 100 may identify that an IP address part corresponding to consecutive bits of 1s corresponds to the network address and an IP address part corresponding to consecutive bits of 0s corresponds to the host address, by referring to the subnet mask including consecutive 1s and consecutive 0s.

In operation 615, the display apparatus 100 may generate a string including one or more characters as a binary number of digits corresponding to the host area in the IP address of the display apparatus 100, according to a predefined scheme. For example, the display apparatus 100 may convert the binary number of digits corresponding to the host area in the IP address of the display apparatus 100 into a decimal number.

In operation 620, the display apparatus 100 may display the generated string on the display thereof.

In operation 625, the electronic apparatus 200 may receive a user input requesting an apparatus connection. For example, the electronic apparatus 200 may output a menu or item for receiving the user input requesting the apparatus connection and receive a user input selecting the menu or item.

In operation 630, the electronic apparatus 200 may output a graphics user interface for inputting address information of the display apparatus 100 to be connected.

In operation 635, the electronic apparatus 200 may receive a string input through the graphics user interface.

More specifically, the user may identify the string displayed on the display of the display apparatus 100 and input the identified string through the graphics user interface of the electronic apparatus 200, in operation 620.

In operation 640, the electronic apparatus 200 may generate a binary number based on the received string. For example, the string may include one or more decimal numbers, and the electronic apparatus 100 may convert the received decimal number into a binary number.

In operation 645, the electronic apparatus 200 may infer the IP address of the display apparatus 100 by combining a binary number of digits corresponding to the network area in the IP address of the electronic apparatus 200 based on the subnet mask of the electronic apparatus 200 with the binary number generated based on the input string.

The electronic apparatus 100 may identify the network address in the IP address of the electronic apparatus 200 by referring to the subnet mask of the electronic apparatus 200. The electronic apparatus 200 may infer the IP address of the display apparatus 100 by combining the network address corresponding to the network area in the identified IP address with the binary number converted from the string input from the user. More specifically, the electronic apparatus 200 may infer the IP address of the display apparatus 100 by replacing the host address part of the IP address with the binary number converted from the string input from the user while leaving the network address part of the IP address of the electronic apparatus 200.

In operation 650, the electronic apparatus 200 may request a connection to the display apparatus 100 based on the inferred IP address of the display apparatus 100. For example, the electronic apparatus 200 may transmit a connection request to the display apparatus 100 through an access point based on the inferred IP address of the display apparatus 100. A method for transmitting the connection request to the display apparatus 100 through the access point is already known and thus will not be described in detail.

In operation 655, the display apparatus 100 may receive the connection request from the electronic apparatus 200 and establish the connection with the electronic apparatus 200.

Figure 7:
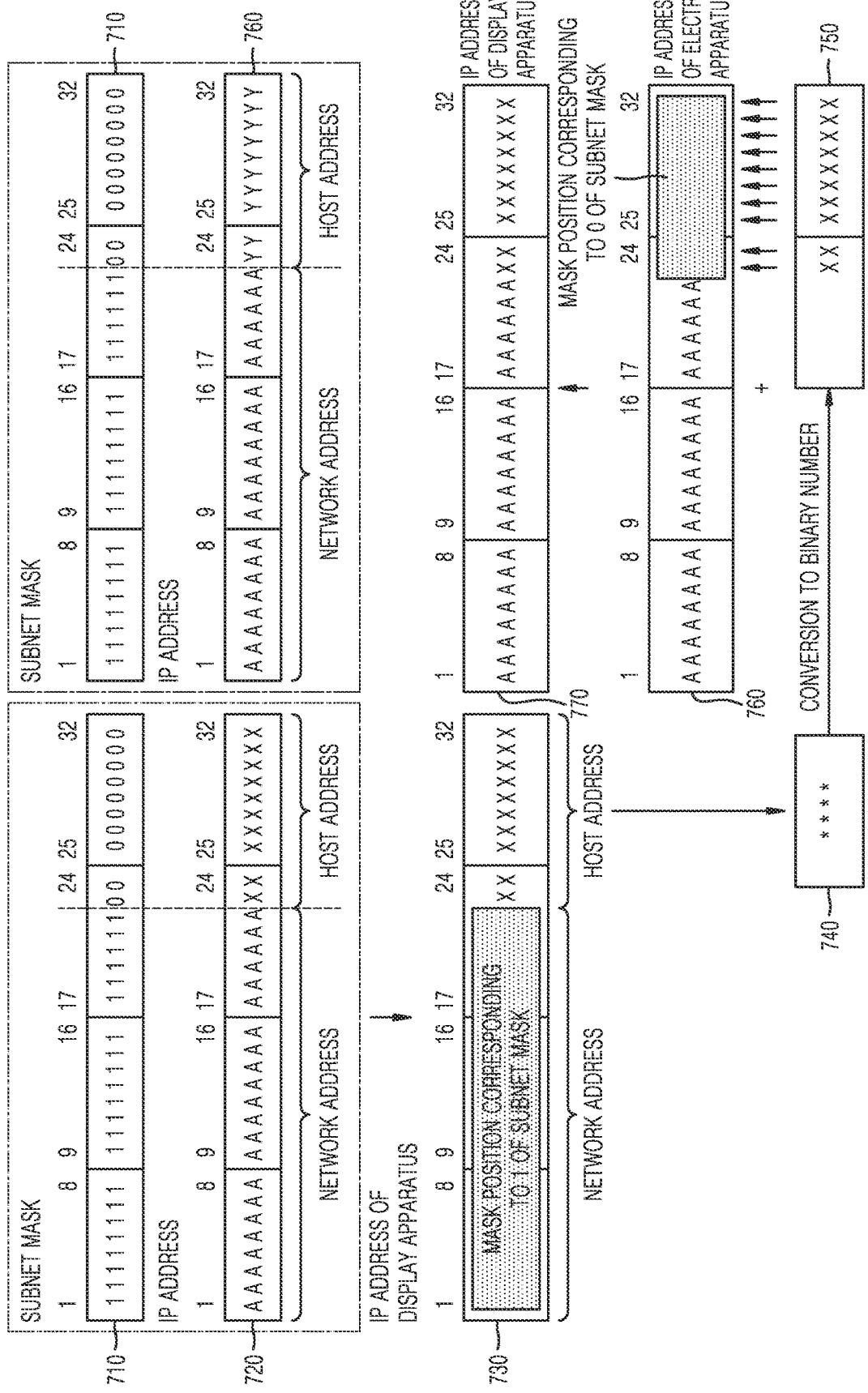
FIG. 7 is a reference diagram for describing an example of converting an IP address into a string by using a part of the IP address, according to an embodiment of the disclosure.

FIG. 7 is a reference diagram for describing an example of converting an IP address into a string by using a part of the IP address, according to an embodiment of the disclosure.

Referring to FIG. 7, a subnet mask 710 of the display apparatus 100 on the same network is 255.255.252.0 and may be expressed as a binary number including consecutive bits of 1s for the $1^{st}$ to $22^{nd}$ bits of the subnet mask 710 and consecutive bits of 0s for the $23^{rd}$ to $32^{nd}$ bits.

Thus, with reference to the subnet mask 710, the display apparatus 100 may identify that $1^{st}$ to $22^{nd}$ bits of an IP address 720 indicate a network address and $23^{rd}$ to $32^{nd}$ bits indicate a host address.

The display apparatus 100 may extract a host address 730 from the IP address 720 of the display apparatus 100 by masking a position corresponding to a bit of 1 of the subnet mask 710. For example, the display apparatus 100 may invert a bit of 0 and a bit of 1 of the subnet mask 710 and perform AND on the inverted subnet mask and the IP address 720 of the display apparatus 100 to obtain the host address of the IP address 720 of the display apparatus 100.

In an example of FIG. 7, the host address is expressed as a total of 10 bits from the $23^{rd}$ to $32^{nd}$ bits, and thus may be converted into a decimal number 740 of a total of four digits as $2^10=1024$.

The electronic apparatus 200 may receive the decimal number 740 and convert the same into a binary number 750.

The electronic apparatus 200 may infer an IP address 770 of the display apparatus 100 based on a network address of an IP address 760 of the electronic apparatus 200 and the binary number 750. More specifically, the electronic apparatus 200 may identify the host address and the network address in the IP address 760 of the electronic apparatus 200 by referring to the subnet mask 710. The display apparatus 100 and the electronic apparatus 200 belong to the same network and thus have the same subnet mask. The electronic apparatus 200 may infer an IP address 770 of the display apparatus 100 by replacing the host address part of the IP address 760 of the electronic apparatus 200 with the binary number 750.

FIG. 8 illustrates a detailed example of converting an IP address into a string by using a part of the IP address, according to an embodiment of the disclosure.

Referring to FIG. 8, the display apparatus 100 may have, for example, an IP address 192.168.1.3 and a subnet mask 255.255.255.0. The display apparatus 100 may identify that the last 8 bits, which are a part corresponding to 0 in the subnet mask, correspond to the host address of the display apparatus 100. The display apparatus 100 may identify a binary number 00000011 of digits corresponding to a host area in the IP address of the display apparatus 100 by referring to the subnet mask of the display apparatus 100.

The display apparatus 100 may convert the binary number 00000011 of digits corresponding to the host area in the IP address of the display apparatus 100 into a decimal number of 3 to display the decimal number on the display 120 of the display apparatus 100, as indicated by 820. For example, the display apparatus 100 may output a message "Input number below for apparatus connection <3>" on the display 120 of the display apparatus 100.

The user may identify the number <3> displayed on the display 120 of the display apparatus 100 and input the number <3> to the electronic apparatus 200. For example, the electronic apparatus 200 may provide a prompt for inputting a number, together with a message "Input number displayed on display apparatus for apparatus connection" on the display 220 of the electronic apparatus 200. The user may input the number <3> displayed on the display 120 of the display apparatus 100 by using such a prompt.

The electronic apparatus 200 may convert the input decimal number <3> into the binary number of 00000011 and infer the IP address of the display apparatus 100 by combining the binary number with the network address of the IP address of the electronic apparatus 200, as indicated by 830. The network address of the IP address of the electronic apparatus 200 is the same as the network address part of the IP address of the display apparatus 100, such that the electronic apparatus 200 may infer the IP address of the display apparatus 100 by combining the network address part of 192.168.1. □ of the IP address of the electronic apparatus 200 with the number of 3 corresponding to the host address part of the display apparatus 100, input from the user. In other words, the electronic apparatus 200 may infer the IP address of the display apparatus 100 by replacing the host address part of 192.168.1. □ of the IP address of the electronic apparatus 200 with the number of 3 corresponding to the host address part of the display apparatus 100, input from the user.

The electronic apparatus 200 may request connection to the display apparatus 100 by using the inferred IP address of 192.168.1.3 of the display apparatus 100, as indicated by 840.

Then, the display apparatus 100 may establish a connection corresponding to the connection request received from the electronic apparatus 200.

FIG. 9 illustrates a detailed example of converting an IP address into a string by using a part of the IP address, according to an embodiment of the disclosure.

Referring to FIG. 9, the display apparatus 100 may have, for example, an IP address 191.168.1.3 and a subnet mask 255.255.0.0. The display apparatus 100 may identify that the last 16 bits, which are a part corresponding to 0 in the subnet mask, correspond to the host address of the display apparatus 100. The display apparatus 100 may identify a binary number of 00000001 00000011 of digits corresponding to the host area in the IP address of the display apparatus 100 by referring to the subnet mask of the display apparatus 100, as indicated by 910.

The display apparatus 100 may convert the binary number of 00000001 00000011 of digits corresponding to the host area in the IP address of the display apparatus 100 into a decimal number of 259 to display the decimal number on the display 120 of the display apparatus 100, as indicated by 920. For example, the display apparatus 100 may output a message "Input number below for apparatus connection <259>" on the display 120 of the display apparatus 100.

The user may identify the number <259> displayed on the display 120 of the display apparatus 100 and input the number <259> to the electronic apparatus 200. For example, the electronic apparatus 200 may provide a prompt for inputting a number, together with a message "Input number displayed on display apparatus for apparatus connection" on the display 220 of the electronic apparatus 200. The user may input the number <259> displayed on the display 120 of the display apparatus 100 by using such a prompt.

The electronic apparatus 200 may convert the input decimal number <259> into the binary number of 00000001 00000011 and infer the IP address of the display apparatus 100 by combining the binary number with the network address of the IP address of the electronic apparatus 200, as indicated by 930. The network address of the IP address of the electronic apparatus 200 is the same as the network address part of the IP address of the display apparatus 100, such that the electronic apparatus 200 may infer the IP address of the display apparatus 100 by combining the network address part of 192.168.1.0 of the IP address of the electronic apparatus 200 with the number of 259 corresponding to the host address part of the display apparatus 100, input from the user. In other words, the electronic apparatus 200 may infer the IP address of the display apparatus 100 by replacing the host address part of 192.168.1. □ of the IP address of the electronic apparatus 200 with the numbers of 1 and 3 corresponding to the host address part of the display apparatus 100, input from the user.

Next, the electronic apparatus 200 may request connection to the display apparatus 100 by using the inferred IP address of 191.168.1.3 of the display apparatus 100, as indicated by 940.

Then, the display apparatus 100 may establish a connection corresponding to the connection request received from the electronic apparatus 200.

Some embodiments of the disclosure may be implemented as a recording medium including a computer-executable instruction such as a computer-executable programming module. The computer-readable recording medium may be an available medium that is accessible by a computer, and include all of a volatile medium, a non-volatile medium, a separated medium, and a non-separated medium. The computer-readable recording medium may also include a computer storage medium. The computer storage medium may include all of a volatile medium, a non-volatile medium, a separated medium, and a non-separated medium, which are implemented by a method or technique for storing information such as a computer-readable instruction, a data structure, a programming module, or other data.

Disclosed embodiments of the disclosure may be implemented as a software (S/W) program including an instruction stored in a computer-readable storage media.

The computer may invoke stored instructions from the storage medium and operate based on the invoked instructions according to the disclosed embodiment of the disclosure, and may include an electronic device according to the disclosed embodiments of the disclosure.

The computer-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

The control method according to the disclosed embodiments of the disclosure may be included and provided in a computer program product. The computer program product may be traded as a product between a seller and a buyer.

The computer program product may include an S/W program and a non-transitory computer-readable recording medium in which the S/W program is stored. For example, the computer program product may include a product (e.g., a downloadable application) in the form of an S/W program electronically distributed through a manufacturer or the device or an electronic market (e.g., Google Play Store or App Store). For the electronic distribution, at least a portion of the S/W program may be stored in a storage medium or temporarily generated. In this case, the storage medium may be a storage medium of a server in the manufacturer, the electronic market, or a relay server that temporarily stores the S/W program.

The computer program product may include a storage medium of a server or a storage medium of a device, in a system including the server and the device. Alternatively, when there is a third device (e.g., a smart phone) communicating with the server or the device, the computer program product may include a storage medium of the third device. Alternatively, the computer program product may include a S/W program itself, which is transmitted from the server to the device or the third device or transmitted from the third device to the device.

In this case, one of the server, the device, and the third device may execute the computer program product to perform the method according to the embodiments of the disclosure. Alternatively, two or more of the server, the device, and the third device may execute the computer program product to execute the method according to the embodiments of the disclosure in a distributed manner.

For example, a server (e.g., a cloud server or artificial intelligence (AI) server, etc.) may execute a computer program product stored in the server to control the device communicating with the server to perform the method according to the embodiments of the disclosure.

In another example, the third device may execute the computer program product to control the device communicated with the third device to perform the method according the disclosed embodiment of the disclosure. When the third device executes the computer program product, the third device may download the computer program product and execute the downloaded computer program product. Alternatively, the third device may execute a computer program product provided in a preloaded state to execute the method according to the disclosed embodiments of the disclosure.

In the specification, the term "unit" may be a hardware component like a processor or a circuit, and/or a software component executed by a hardware component like a processor.

Those of ordinary skill in the art to which the disclosure pertains will appreciate that the disclosure may be implemented in different detailed ways without departing from the technical spirit or essential characteristics of the disclosure.

Accordingly, the aforementioned embodiments of the disclosure should be construed as being only illustrative, but should not be constructed as being restrictive from all aspects. For example, each element described as a single type may be implemented in a distributed manner, and likewise, elements described as being distributed may be implemented as a coupled type.

The scope of the disclosure is defined by the following claims rather than the detailed description, and the meanings and scope of the claims and all changes or modified forms derived from their equivalents should be construed as falling within the scope of the disclosure.

What is claimed is:

1. A display apparatus comprising:
a display;
a memory to store one or more instructions; and
a processor configured to execute the one or more instructions stored in the memory, the processor executing the one or more instructions to:
receive a request for a connection with an electronic apparatus;
identify a host address in an Internet protocol (IP) address of the display apparatus by referring to a subnet mask of the display apparatus;
convert the identified host address into a string comprising one or more characters according to a predefined scheme;
display the string on the display to allow a user to input the string to the electronic apparatus to cause the electronic apparatus to infer the IP address of the display apparatus;
receive a connection request from the electronic apparatus using inferred IP address of the display apparatus which is inferred based on the string which the user inputted to the electronic apparatus; and
establish the connection with the electronic apparatus.

2. The display apparatus of claim 1, wherein the processor is further configured to, by executing the one or more instructions, identify, as the host address, bit values of the IP address of the display apparatus in positions corresponding to consecutive bits of 0s in the subnet mask of the display apparatus.

3. The display apparatus of claim 1, wherein the processor is further configured to, by executing the one or more instructions, convert the identified host address into the string by converting a binary number of the identified host address into a decimal number.

4. An electronic apparatus comprising:
a display;
a memory to store one or more instructions; and
a processor configured to execute the one or more instructions stored in the memory, the processor executing the one or more instructions to:
output a graphics user interface for inputting address information of a display apparatus to which the electronic apparatus is to be connected;
receive a string input through the graphics user interface, the string input being inputted from a user based on a string displayed on a display of the display apparatus;
obtain a host address of the display apparatus from the received string input;
identify a network address in an Internet protocol (IP) address of the electronic apparatus by referring to a subnet mask of the electronic apparatus;

infer an IP address of the display apparatus by combining the identified network address of the electronic apparatus with the obtained host address of the display apparatus; and transmit a connection request to the display apparatus by using the inferred IP address of the display apparatus.

5. The electronic apparatus of claim 4, wherein the processor is further configured to, by executing the one or more instructions, identify, as the network address, bit values of the IP address of the electronic apparatus in positions corresponding to consecutive bits of 1s in the subnet mask of the electronic apparatus.

6. The electronic apparatus of claim 4, wherein the processor is further configured to, by executing the one or more instructions, obtain the host address of the display apparatus by converting a decimal number expressed according to the received string input into a binary number.

7. The electronic apparatus of claim 4, wherein the processor is further configured to, by executing the one or more instructions, infer the IP address of the display apparatus by combining the identified network address which is expressed as a binary number with the host address of the display apparatus which is expressed as a binary number.

8. An operating method of a display apparatus, the operating method comprising:
receiving a request for a connection with an electronic apparatus;
identifying a host address in an Internet protocol (IP) address of the display apparatus by referring to a subnet mask of the display apparatus;
converting the identified host address into a string comprising one or more characters according to a predefined scheme;
displaying the string on a display to allow a user to input the string to the electronic apparatus to cause the electronic apparatus to infer the IP address of the display apparatus;
receiving a connection request from the electronic apparatus using inferred IP address of the display apparatus which is inferred based on the string which the user inputted to the electronic apparatus; and
establishing the connection with the electronic apparatus.

9. The operating method of claim 8, further comprising identifying, as the host address, bit values of the IP address of the display apparatus in positions corresponding to consecutive bits of 0s in the subnet mask of the display apparatus.

10. The operating method of claim 8, further comprising converting the identified host address into the string by converting a binary number of the identified host address into a decimal number.

11. An operating method of an electronic apparatus, the operating method comprising:
outputting a graphics user interface for inputting address information of a display apparatus to which the electronic apparatus is to be connected;
receiving a string input through the graphics user interface, the string input being inputted from a user based on a string displayed on a display of the display apparatus;
obtaining a host address of the display apparatus from the received string input;
identifying a network address in an Internet protocol (IP) address of the electronic apparatus by referring to a subnet mask of the electronic apparatus;
inferring an IP address of the display apparatus by combining the identified network address of the electronic apparatus with the obtained host address of the display apparatus; and
transmitting a connection request to the display apparatus by using the inferred IP address of the display apparatus.

12. The operating method of claim 11, further comprising identifying, as the network address, bit values of the IP address of the electronic apparatus in positions corresponding to consecutive bits of 1s in the subnet mask of the electronic apparatus.

13. The operating method of claim 11, further comprising obtaining the host address of the display apparatus by converting a decimal number expressed according to the received string input into a binary number.

14. A non-transitory computer-readable recording medium having recorded thereon one or more programs executable by a processor of a display apparatus to implement an operating method of the display apparatus, the operating method of the display apparatus comprising:
receiving a request for a connection with an electronic apparatus;
identifying a host address in an Internet protocol (IP) address of the display apparatus by referring to a subnet mask of the display apparatus;
converting the identified host address into a string comprising one or more characters according to a predefined scheme;
displaying the string on a display to allow a user to input the string to the electronic apparatus to cause the electronic apparatus to infer the IP address of the display apparatus;
receiving a connection request from the electronic apparatus using inferred IP address of the display apparatus which is inferred based on the string which the user inputted to the electronic apparatus; and
establishing the connection with the electronic apparatus.

15. A non-transitory computer-readable recording medium having recorded thereon one or more programs executable by a processor of an electronic apparatus to implement an operating method of the electronic apparatus, the operating method of the electronic apparatus comprising:
outputting a graphics user interface for inputting address information of a display apparatus to which the electronic apparatus is to be connected;
receiving a string input through the graphics user interface, the string input being inputted from a user based on a string displayed on a display of the display apparatus;
obtaining a host address of the display apparatus from the received string input;
identifying a network address in an Internet protocol (IP) address of the electronic apparatus by referring to a subnet mask of the electronic apparatus;
inferring an IP address of the display apparatus by combining the identified network address of the electronic apparatus with the obtained host address of the display apparatus; and
transmitting a connection request to the display apparatus by using the inferred IP address of the display apparatus.

16. The operating method of claim 13, further comprising inferring the IP address of the display apparatus by combining the identified network address which is expressed as a binary number with the host address of the display apparatus which is expressed as a binary number.

* * * * *